United States Patent

[11] 3,596,728

| [72] | Inventor | George Edgar Neville<br>Cresta Lodge, Robin Down Lane,<br>Mansfield, Nottinghamshire, England |
|------|----------|---|
| [21] | Appl. No. | 786,970 |
| [22] | Filed | Dec. 26, 1968 |
| [45] | Patented | Aug. 3, 1971 |
| [32] | Priority | Dec. 30, 1967 |
| [33] | | Great Britain |
| [31] | | 59290/67 |

[54] EMERGENCY DRIVE FOR VEHICLES
5 Claims, 12 Drawing Figs.

[52] U.S. Cl. .......... 180/24.12, 180/14 A, 180/66, 180/74
[51] Int. Cl. .......... B60k 17/14, B60k 17/36, B60k 59/02
[50] Field of Search .......... 180/22 H, 74

[56] References Cited
UNITED STATES PATENTS

| 1,198,098 | 9/1916 | Bergh | 180/74 UX |
| 1,394,328 | 10/1921 | Miller | 180/74 UX |
| 2,686,571 | 8/1954 | Horste | 180/74 |
| 2,747,677 | 5/1956 | Barfield | 180/74 X |
| 2,954,836 | 10/1960 | Cavanaugh | 180/74 |
| 3,005,510 | 10/1961 | Phillips | 180/74 X |
| 3,447,622 | 6/1969 | Ovshinsky et al. | 180/22 H |
| 3,454,125 | 7/1969 | Wagner | 180/74 |

*Primary Examiner*—A. Harry Levy
*Attorney*—Larson, Taylor & Hinds

ABSTRACT: In a vehicle having front and rear pairs of wheels, the two wheels at each side are connected at will by a roller arrangement acting as an idler. There may be a mechanical or hydraulic connection between the rollers at opposite sides of the vehicle, providing a differential lock. Alternatively, an emergency drive for a single pair of wheels is provided by hydraulically driven rollers movable into and out of engagement with the wheels.

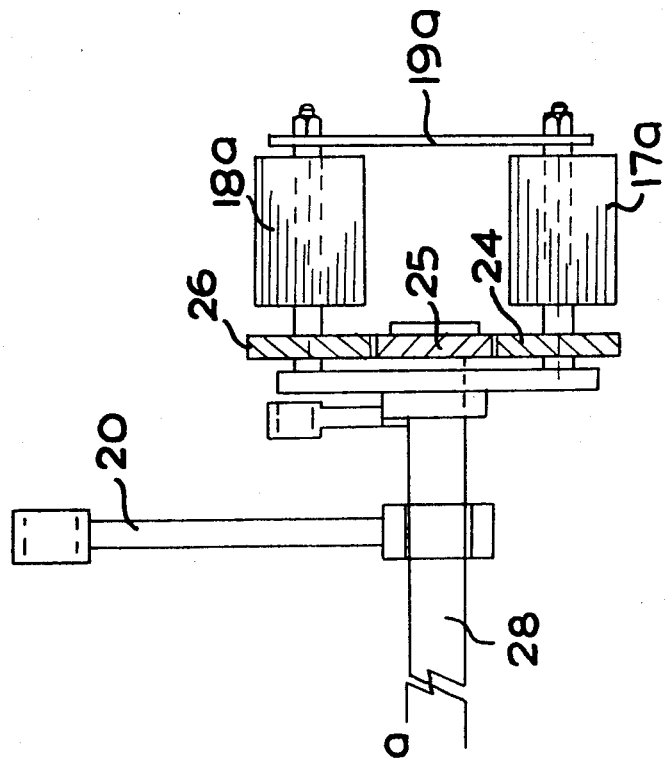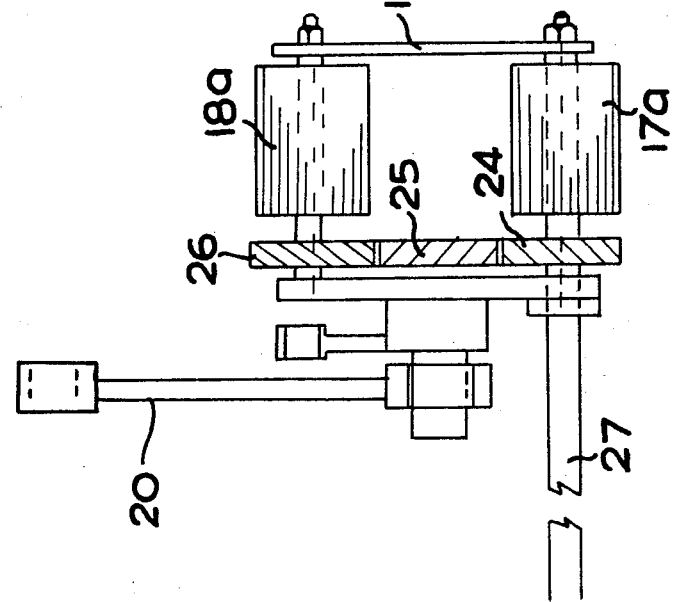

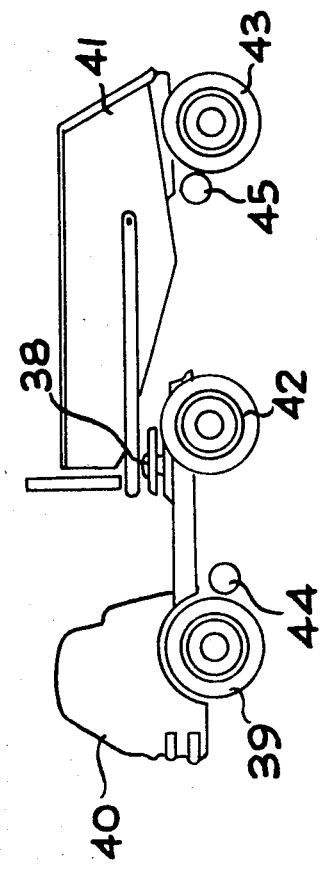
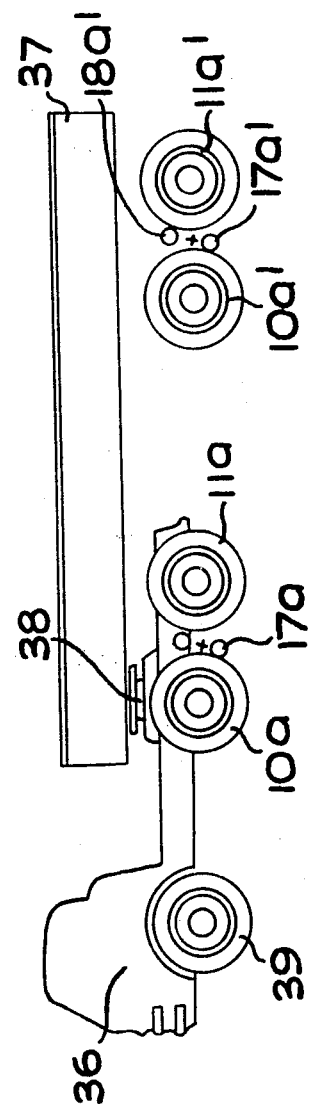

EMERGENCY DRIVE FOR VEHICLES

This invention is an improved emergency drive for vehicles, specifically for applying driving effort to the nondriven wheels of vehicles and to the nondriven wheels of semitrailer and trailer vehicles.

In general, multiwheel vehicles (that is to say, vehicles having six or eight load-bearing wheels) are of two types.

In one type there are two pairs of rear load-bearing wheels, the drive from the vehicle engine being applied to the front pair only by way of a suitable transmission mechanism including differential gearing in the axle of this front pair. This construction is relatively light and therefore provides good pay load capacity. It is cheap to manufacture and economical to operate, because it has less friction losses to overcome and less tare weight to move. Its disadvantage is that under poor road surface conditions, tractive adhesion between the tires and the road surface is soon lost and the vehicle stalls or skids.

In the second type both pairs of load-bearing rear wheels are driven through differential gearing. This construction is relatively heavy, resulting in less pay load capacity. It is relatively expensive to produce and operate. Its chief advantage is that since both pairs of rear wheels are driven, the tractive effort between the tires and road surface is seldom lost regardless of road surface conditions.

A disadvantage of both types of construction is that when the driving wheel, or driving wheels, at one side of the vehicle spins or spin, the effect of the differential gearing is that no driving effort is applied to the wheel or wheels at the other side of the vehicle, so that in effect all tractive effort is lost. In order to overcome this difficulty it is known to provide a differential locking device.

An object of this invention is to provide an auxiliary drive whereby driving effort may be applied to the normally nondriven pairs of wheels and, preferably, to do this by means which automatically lock the differential of the driven axle, and drive the normally nondriven wheels in unison as would be the case of a second axle with differential locked.

The invention, therefore, provides a vehicle, having front and rear wheels at each side constituting a front pair and a rear pair of wheels whereof one pair is normally power-driven and the rear pair is not driven, characterized by driving means, for driving the rear pair of wheels, which is capable of being rendered operative and inoperative at will and comprises driving rollers for engaging and driving the wheels of said other pair. Preferably, these driving rollers are movable into and out of engaging position.

There is an engineering advantage in arranging for the rollers to be imposed below the wheel center if the drive is applied to the foremost axle because in this position when extra traction is normally required in the forward direction, the effect of slip of either of the driven wheels is to force the rollers more tightly between the wheels in a self-energizing action so as to provide a positive grip.

In a vehicle wherein the two pairs of wheels are relatively close together in the fore-and-aft direction of the vehicle, the driving rollers may also engage the peripheries of the wheels of the driven pair and act as drive transmitting idlers to transmit the drive to the wheels of the other pair. Alternatively, the rollers may be driven through an independent drive, which may consist of an hydraulic motor driven from the engine of the vehicle. In a composite vehicle comprising a tractor and a trailer this last-mentioned construction can be employed to drive two pairs of trailer wheels or a single pair of trailer wheels.

Alternatively, the rollers may be driven by independent means which may consist of a hydraulic motor energized by a hydraulic pump which may be an integral part of the roller mechanism or may be engine driven. In a composite vehicle the last-mentioned construction can be employed to drive either:
1. The front steering wheels of a vehicle
2. Two pairs of wheels of a trailing vehicle.
3. A single pair of trailer wheels.
4. In the case of a vehicle towing separate wheeled vehicles the said construction can be used to drive these additional wheels.

In order to obtain the efficiencies and economies of standardization, the multitudinous combinations of axle suspensions, wheel sizes, braking and driving means which call for varying roller diameters and varying means of interconnecting for differential locking purposes, it has been found an engineering benefit to develop the simple roller into a combination of two gear-connected or chain-connected rollers which merely need to rotate about a given center in order to contact the surfaces of wheels having different spacings or sizes.

The latter mentioned design facilitates inter roller connection across the vehicle chassis for differential locking purposes because the interconnecting shaft can be at a low level or retained in a constant operative and nonoperative position.

In addition the above the design provides a convenient means of incorporating a hydraulic pump for the purpose of providing differential locking by hydraulic means where this is impractical by mechanical means, or for energizing auxiliary hydraulic motor drives.

The invention further provides a vehicle having a pair of wheels which, normally, are not driven, and driving means for driving these wheels at will comprising power-driven rollers movable into and out of driving engagement with the wheels.

In order that the invention may be better understood, reference will now be made to the accompanying drawings, in which:

FIG. 6 shows one arrangement according to FIGS. 4 and 5, while

FIG. 7 shows a modified form thereof;

FIG. 11 illustrates a tractor-trailer combination in which the tractor has two pairs of rear wheels whereof only the front pair is normally driven and the trailer has front and rear pairs of wheels which normally are not driven;

FIG. 12 illustrates a tractor-trailer combination in which the trailer has a single pair of wheels.

Figure 1:
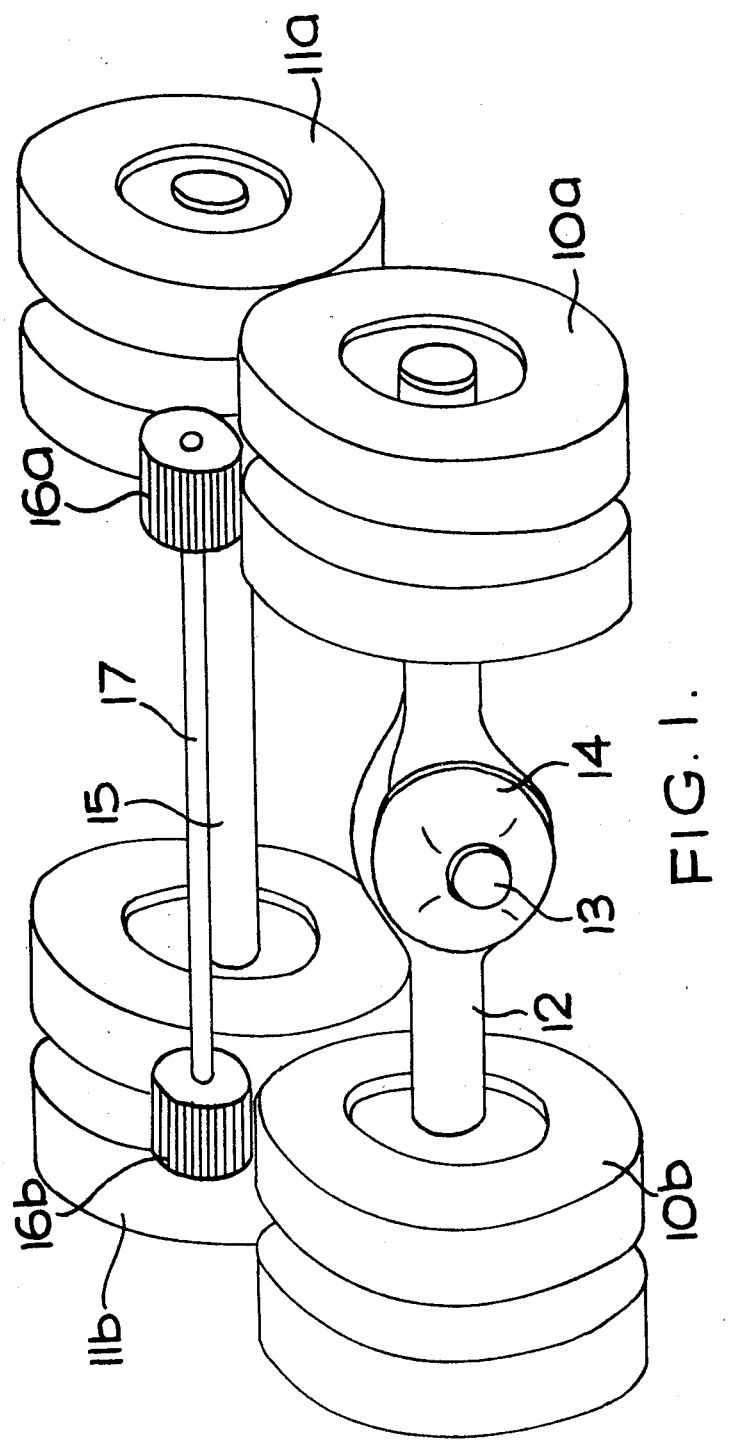
FIG. 1 is a perspective view showing the conventional layout of two rear axles as used in single-axle-driven six-wheeled and eight-wheeled vehicles in which the driven axle is normally situated in front of the nondriven axle. For the convenience of illustration the rollers and connecting shaft are shown in position above the wheels instead of the preferred position below the center of the wheels.

Turning now to FIG. 1, in the layout therein illustrated there is a front pair of road wheels 10a and 10b and a rear pair 11a and 11b. The front pair are carried by an axle indicated generally at 12 and driving effort is applied through input shaft 13 and a differential gearing 14, all of conventional form. The function of this differential in distributing the torque between wheels 10a and 10b is understood. Wheels 11a, 11b are mounted on an axle 15. This may be a dead axle if the wheels are required to be capable of independent rotation, or may be a live axle if the wheels are only to rotate in common.

Figure 2:
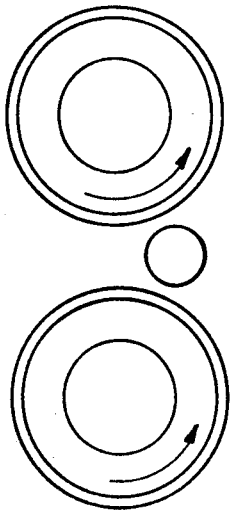
FIGS. 2 and 3 are side elevations illustrating the driving roller in the operative and inoperative positions respectively.
Figure 3:
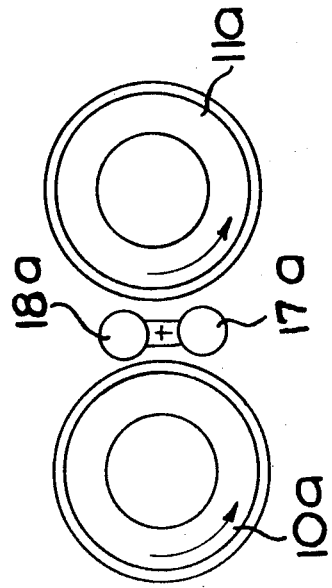

A pair of idler rollers 16a, 16b carried by an axle 17 is provided for engagement with the respective wheels 10a, 11a and 10b, 11b. When in the operative position, these rollers transmit the driving effort from the wheels 10a, 10b to wheels 11a, 11b. They can be moved by any suitable means to the inoperative position in which they do not engage these wheels. In FIG. 1, the rollers 16a, 16b are shown as engaging the road wheels above the plane containing the wheel axes and are raised and lowered between inoperative and operative positions. However, FIGS. 2 and 3 illustrate the preferred arrangement in which the rollers engage the wheels below said plane and are raised to operative position and lowered to inoperative position.

This movement is effected under the control of the driver. It may be effected mechanically, hydraulically or pneumatically. Thus, for example, the rollers may be biased to the inoperative position by spring means and forced to the operative position mechanically, hydraulically or pneumatically.

It will be understood that if the rollers 16a, 16b are connected, as by axle 17, when operative they lock the differential 14. It is within the scope of the invention to provide a releasable connection (not shown) for connecting them together at will.

It will be readily understood that if single unconnected rollers 16a, 16b are moved into the operative position they will transmit drive from one wheel to another normally undriven wheel but without the benefit of improved traction from differential locking.

If the rollers 16a, 16b are capable of independent rotation, they cannot operate as a differential lock, unless the wheels 11a, 11b are only capable of rotation in unison being, for example, fixed on a live axle 15. On the other hand, if the rollers 16a, 16b are incapable of independent rotation they operate as a differential lock irrespective of the manner in which wheels 11a, 11b are mounted.

Figure 4:
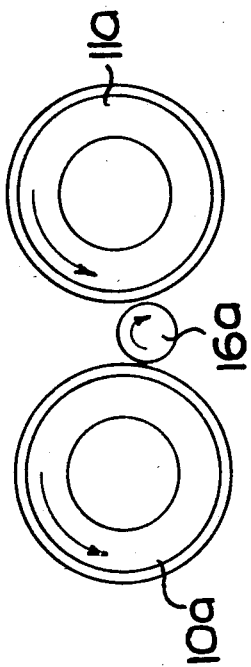
FIGS. 4 and 5 are side elevations illustrating a preferred arrangement of driving rollers in the operative and inoperative positions respectively.
Figure 5:
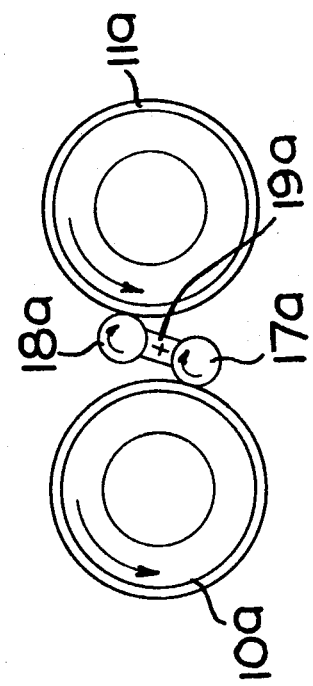

Instead of a single roller 16a, 16b at each side, it is preferred to employ two connected rollers 17a, 18a, 17b, 18b mounted in swinging frames 19a, 19b for movement between an operative position FIG. 4 in which one roller 18a or 18b engages a rear wheel 11a, 11b and the other roller 17a, 17b engages the front driven wheel 10a, 10b, and an inoperative position FIG. 5.

Figure 9:
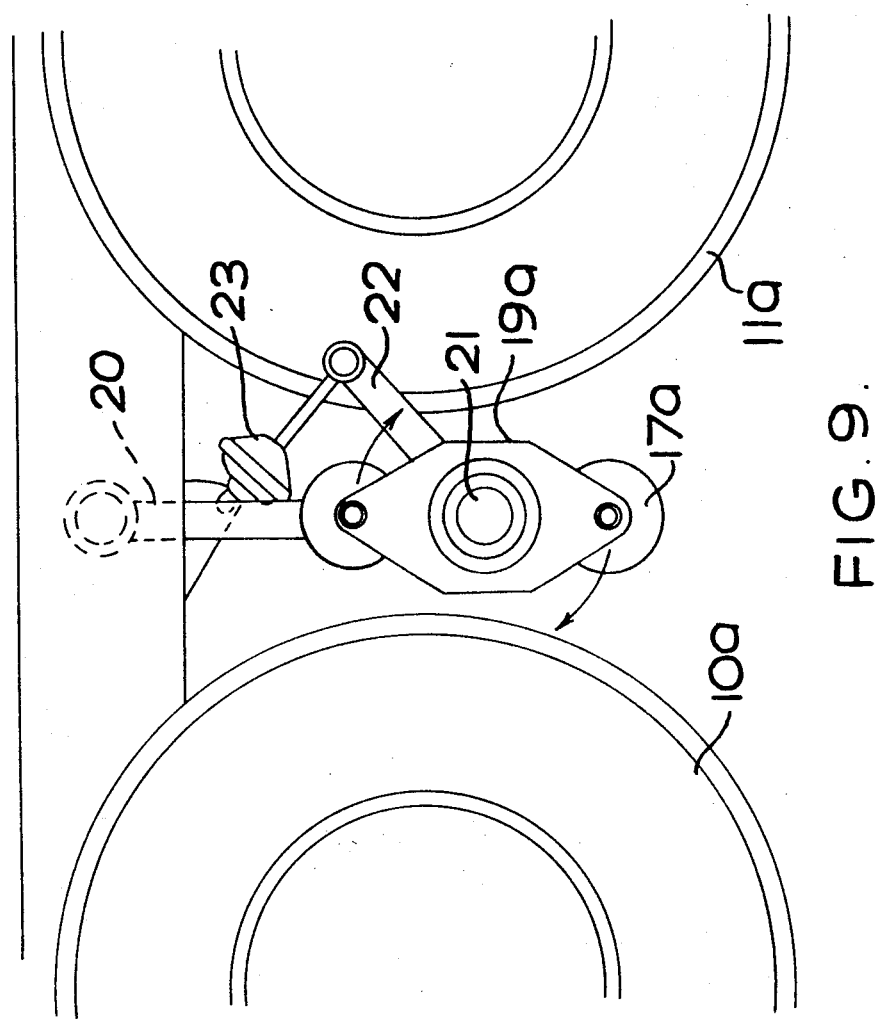
FIG. 9 is a side elevation showing one form of mechanism for moving the rollers between operative and inoperative positions.

Rollers 17a, 17b engage wheels 10a, 10b below the wheel axis so as to provide a self-energizing action. Each frame 19a, 19b is pivotally suspended by means such as 20 and is rocked between operative and inoperative positions about an axis 21 between its rollers. For example, it may be rocked by means of a lever 22 and an hydraulic or pneumatic actuator 23 (see FIG. 9).

Figure 8:
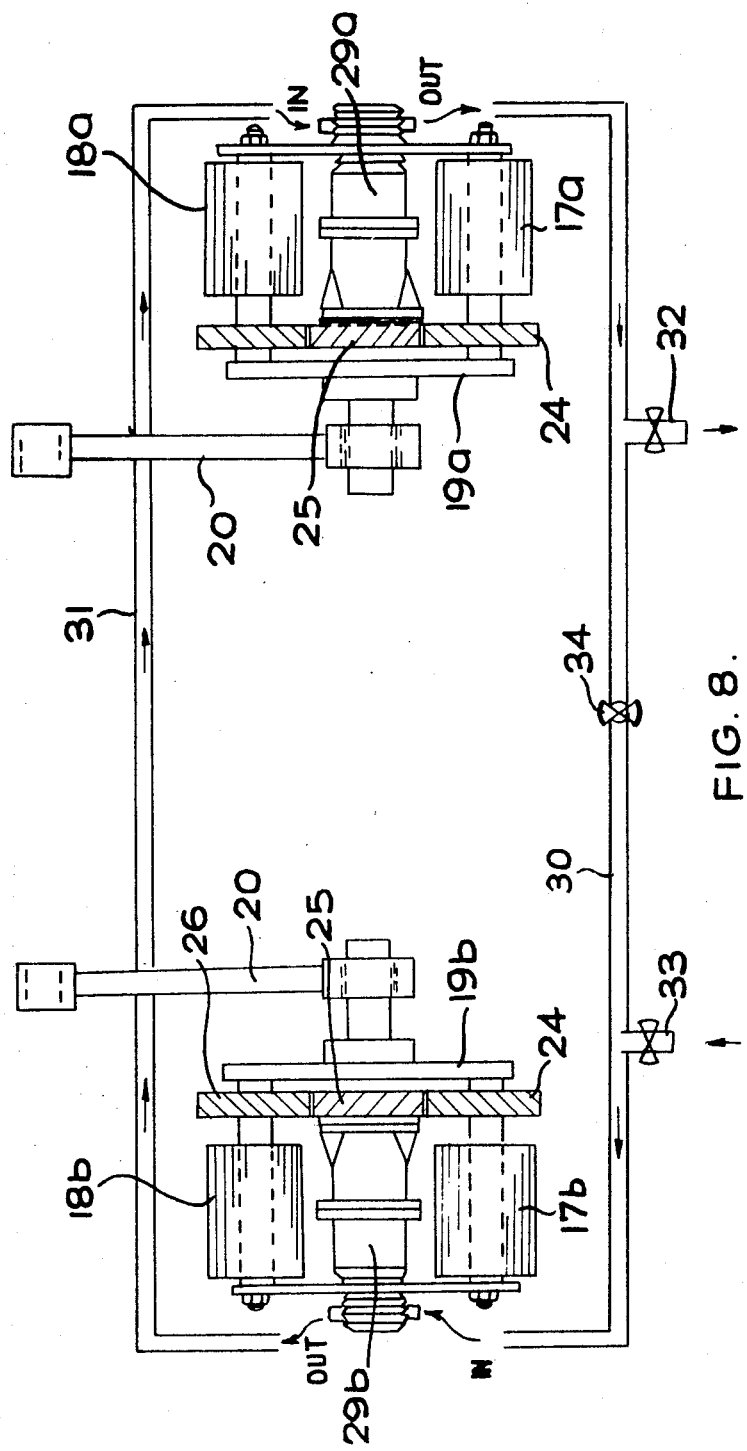
FIG. 8 is a diagram showing an arrangement in which the rollers are connected to hydraulic pump-motors which are hydraulically interconnected to provide a differential lock or to provide a pressure supply for a remote hydraulic motor.

As shown in FIGS. 6, 7 and 8, the two rollers of each set are positively connected so as to rotate in the same direction. This connection may be effected by a train of gears, such as 24, 25 and 26, or by chain and sprocket gearing.

The rollers of the two sets are connected together, or are adapted to be connected together at will, so as to rotate in unison. In FIG. 6 this connection is provided by a cross-shaft 27 between rollers 17a, 17b. In FIG. 7 it is provided by a cross-shaft extending between the intermediate gears 25. In this manner the combined vehicle may be converted at will into a multiwheel drive vehicle. It will be understood that in the event of the trailer being fitted with either one single axle or a plurality of axles, this means of driving the trailer wheels could be applied to one or more axles.

In the arrangement shown in FIG. 8, the rollers of the two sets are respectively connected to hydraulic pump-motors 29a, 29b. An hydraulic pump-motor is a device which can function either as a pump or a motor. These two devices 29a, 29b are connected in a closed hydraulic circuit by pipes 30, 31, the output of each device being supplied as input to the other device so that the two devices and two sets of rollers necessarily rotate in unison, thus providing a differential lock. The advantage of connecting the two sets of rollers hydraulically is that the hydraulic connections 30, 31 can follow an indirect path transversely of the vehicle thus avoiding obstructions, such for example as vehicle chassis members, that would prevent the direct connection by mechanical means. If desired the hydraulic circuit may be tapped to provide at 32 a feed to and at 33 a return from a remote hydraulic motor, which may provide the power for other purposes. A shutoff valve 34 is interposed in pipe 30 between the connections 32, 33, and connections 32, 33 are valve controlled.

Figure 10:
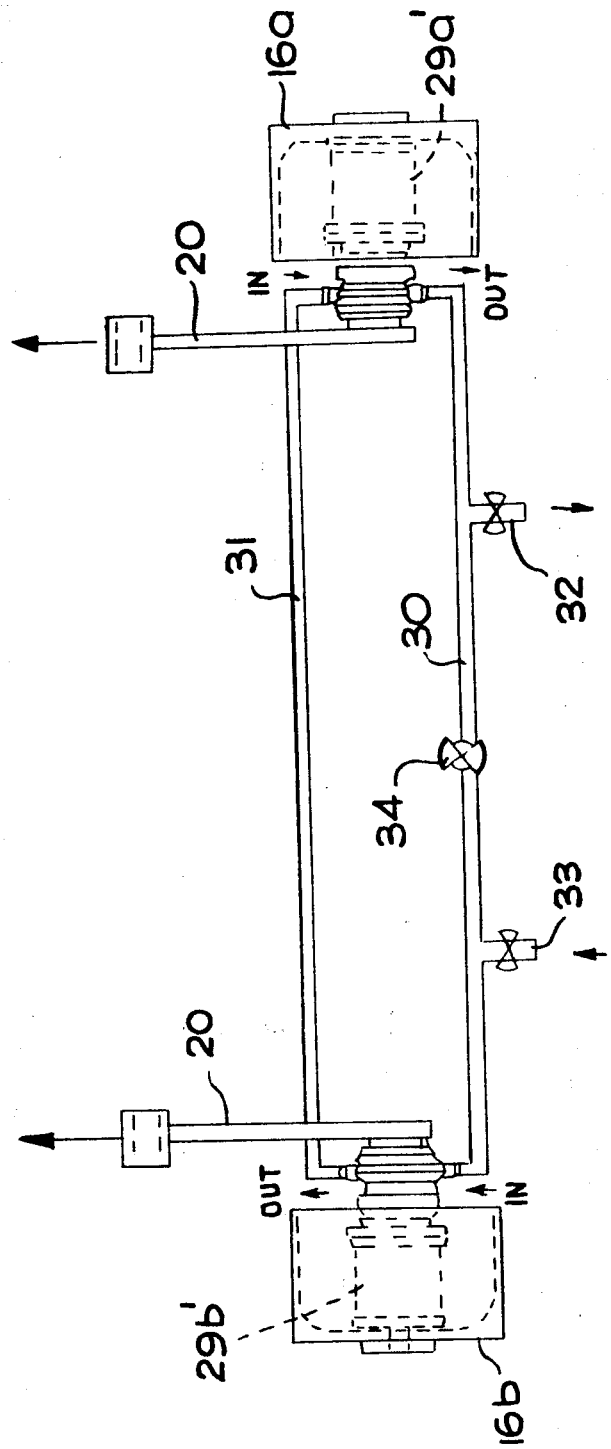
FIG. 10 is a diagram showing an arrangement similar to that shown in FIG. 8 but incorporating a single roller at each side.

The adaption of this hydraulic connection to single rollers 16a, 16b is illustrated in FIG. 10, wherein each roller contains an hydraulic motor 29a or 29b.

Turning now to FIG. 11, there is illustrated a tractor-trailer vehicle comprising a tractor 36 and trailer 37, the two being articulated together at 38 by a "fifth wheel" coupling in known manner. Tractor 36 has a pair of steerable front wheels 39 and two pairs of rear wheels represented by the wheels 10a, 11a. Normally only the front pair of rear wheels is power driven from the tractor engine through a differential. The front and rear wheels of each pair are arranged to be connected at will by a roller mechanism according to the present invention, which may consist of single rollers as illustrated in FIG. 1 or FIG. 10 or two rollers as illustrated in FIGS. 4 to 9.

The trailer 37 has front and rear pairs of wheels as represented by the wheels 10a', 11a' at one side. Normally these two pairs of wheels are not driven. They are interconnected at will by a roller mechanism according to the present invention which may comprise a single roller at each side or two rollers as represented by rollers 17a', 18a'. *These rollers are driven by an hydraulic motor or motors supplied with hydraulic fluid from an engine-driven pump in the tractor 36 or from an hydraulic pump associated with the roller assembly of the tractor rear wheels. Thus the rollers of the trailer rear wheels may be supplied with hydraulic fluid drawn from an hydraulic circuit such as is illustrated in FIG. 8 or FIG. 10. Alternatively, the hydraulic pump may be driven by an axle such as 27, FIG. 6 or 28 FIG. 7. It will be appreciated that in this manner the combined vehicle may be converted at will into a eight-wheel-drive vehicle.*

FIG. 12 shows a modification of the invention in which the tractor 40 has steerable front wheels 39 and a single pair of power-driven rear wheels 42, while the trailer 41 has a single pair of wheels 43 which are not normally driven. Associated with the steerable wheels 39, there is a pair of driving rollers 44, which can be brought into engagement with the steerable wheels at the will of the operator by means such as already described and which are driven by an hydraulic motor or motors supplied with hydraulic fluid from a pump driven by the tractor engine. This hydraulic motor or motors, or the pump, is/are brought into operation at the will of the driver when it is required to apply driving power to the steerable wheels 39. Desirably, it is, or they are, only brought into operation when the rollers 44 are engaged with the steerable wheels. It will be understood that the rollers 44 must partake of the steering movements of the wheels 39.

Associated with the trailer wheels 43, there is a pair of driving rollers 45 which can be brought into driving contact with these wheels at the will of the operator and which are driven by an hydraulic motor or motors supplied with hydraulic fluid at the will of the operator from a pump driven by the tractor engine. Thus, at the will of the operator, the combined vehicle can be converted from a two-wheel drive vehicle into a four-wheel drive or a six-wheel drive vehicle.

It will be understood that in all constructions according to this invention, the rollers must be so mounted that when brought to operative position they will maintain the necessary engagement with the wheels, irrespective of the springing movements of the latter occasioned by road conditions. The rollers must be of a suitable diameter and their peripheral surface must be such as to give good gripping characteristics in contact with the tires of the wheels.

The invention is not restricted to the upward movement of the single roller units into operative position. For example, they can move downwards to engage appropriate regions of the peripheries of the wheels as an alternative to the rotating action of the preferred roller designs.

Furthermore, although reference has been made herein to rollers engaging to peripheries of the wheels, instead of such rollers it is within the scope of the invention to employ gearwheels engaging other gearwheels that are coaxial with and coupled to the wheels. Thus, for example, in the case of twin wheels (or twin tired wheels) such as are illustrated in FIG. 1, there can be a thin gear disposed between the twin tires, but of an appropriately smaller diameter than the tires, this gear being engaged by another gear which is the equivalent of rollers 16a, 16b.

In a further alternative, which is not illustrated, instead of each pair of rollers 17a, 18a, 17b, 18b engaging directly with the wheels each pair may be provided with an endless belt or chain which runs over them and engages the wheels when each assembly of rollers and belt or chain is moved to operative position. This belt or chain may have an appreciable arc of contact with each wheel. Its outer surface should be such as to have an adequate driving engagement with the wheels. It may also serve to couple the two rollers together (instead of the gears of FIGS. 6—8, or the chain and sprocket gearing before mentioned); for example it may have teeth on its inner surface engaging teeth on the rollers.

Therefore the reference to rollers which engage the wheels is intended to include (a) direct engagement of the rollers with the wheels, (b) driving gears which engage gears coupled to the wheels, and (c) indirect engagement of the rollers with the wheels, through an endless belt or chain.

In FIGS. 8 and 10 the hydraulic circuit of the hydraulic units is shown looped so that the flow of oil causes the rollers to rotate in perfect synchronization with each other. If one pipeline of this circuit is interrupted so that the flow of oil is diverted to pass through similar units before returning to complete the circuit, energy is then passed from the first unit to an auxiliary unit situated on a trailing axle or axles which rotates the latter at wheel periphery speeds in perfect synchronization with the driven axle.

Similarly, with hydraulic roller units in operation on towing and trailer vehicles this invention prevents the locking of individual wheels or axle sets and reduces the braking hazards of large or composite vehicles operating under adverse road conditions.

Further to the above, by restricting the flow of oil the hydraulic versions become a means of providing nonwheel-locking braking.

I claim:

1. A vehicle, having front and rear wheels at each side constituting a front pair and a rear pair of wheels, said vehicle carrying a coupling device for the two wheels at each side, the coupling device being displaceable relative to the wheels between an operative position in which it drivingly couples the two wheels together and an inoperative position in which it does not drivingly couple the two wheels, each of which coupling devices comprises two interconnected rollers having spaced-apart parallel axes which in the operative position drivingly engage the peripheries of the two wheels, and which in the inoperative position do not so engage the two wheels, and wherein each coupling device incorporates a hydraulic pump-motor coupled to its rollers, the output of each pump-motor being hydraulically connected to the input of the other pump-motor.

2. A vehicle according to claim 1, in which each coupling device is mounted to rock about an axis which is located between the axes of the front and rear wheels, in movement between its operative and inoperative positions.

3. A vehicle according to claim 2, in which, in the operative position of each coupling device, one of its rollers drivingly engages one of the two wheels above the axis of that wheel and the other roller drivingly engages the other wheel below the axis of that wheel.

4. A vehicle according to claim 2, wherein one roller of each device engages the front wheel of the associated two wheels below the axis of that front wheel and the other roller engages the rear of the associated two wheels above the axis of that rear wheel.

5. A vehicle according to claim 2 wherein the axis of each coupling device is stationery.